(12) United States Patent
Kardashov et al.

(10) Patent No.: US 8,893,143 B2
(45) Date of Patent: Nov. 18, 2014

(54) HARDWARE VIRTUALIZATION FOR MEDIA PROCESSING

(75) Inventors: Timor Kardashov, Kyriat Ono (IL); Maxim Kovalenko, Rehovot (IL); Arie Elias, Zur Igal (IL); Guy Ray, Beit Nir (IL)

(73) Assignee: Marvell World Trade Ltd., St. Michael (BB)

( * ) Notice: Subject to any disclaimer, the term of this patent is extended or adjusted under 35 U.S.C. 154(b) by 964 days.

(21) Appl. No.: 13/005,850

(22) Filed: Jan. 13, 2011

(65) Prior Publication Data
US 2011/0173362 A1 Jul. 14, 2011

Related U.S. Application Data

(60) Provisional application No. 61/294,711, filed on Jan. 13, 2010.

(51) Int. Cl.
| | |
|---|---|
| G06F 9/455 | (2006.01) |
| G06F 9/50 | (2006.01) |
| G06F 12/00 | (2006.01) |
| G06F 9/48 | (2006.01) |
| G06F 9/46 | (2006.01) |
| G06F 12/10 | (2006.01) |

(52) U.S. Cl.
CPC ............... *G06F 9/5027* (2013.01); *G06F 9/48* (2013.01); *G06F 9/461* (2013.01); *G06F 9/5077* (2013.01); *G06F 9/50* (2013.01); *G06F 12/109* (2013.01); *G06F 12/1036* (2013.01); *G06F 9/455* (2013.01)
USPC .............. 718/104; 718/1; 718/108; 711/6; 711/203

(58) Field of Classification Search
None
See application file for complete search history.

(56) References Cited

U.S. PATENT DOCUMENTS

| | | | |
|---|---|---|---|
| 8,612,992 B2* | 12/2013 | Lescouet et al. ............... | 718/108 |
| 2005/0050541 A1* | 3/2005 | Sun et al. ...................... | 718/100 |

(Continued)

FOREIGN PATENT DOCUMENTS

| | | |
|---|---|---|
| EP | 1 669 864 | 6/2006 |
| WO | WO 2007/092951 A2 | 8/2007 |

OTHER PUBLICATIONS

International Preliminary Report on Patentability with attached Written Opinion of International Searching Authority, issued Jul. 17, 2012 in counterpart International Application No. PCT/IB/2011/000271.

(Continued)

*Primary Examiner* — Qing Wu

(57) ABSTRACT

Methods and systems for implementing virtual processors are disclosed. For example, in an embodiment a processing apparatus configured to act as a plurality of virtual processors includes a first virtual program space that includes a first program execution memory, the first program execution memory including code to run a non-real-time operating system capable of supporting a one or more non-real-time applications, a second virtual program space that includes a second program execution memory, the second program execution memory including code to run one or more real-time processes, and a central processing unit (CPU) configured to operate in a first operating mode and a second operating mode, the CPU being configured to perform operating system and application activities using the first virtual program space for the first operating mode without using the second virtual program space and without appreciably interfering with the one or more real-time processes that are running in the second operating mode.

15 Claims, 4 Drawing Sheets

(56) References Cited

U.S. PATENT DOCUMENTS

| | | |
|---|---|---|
| 2005/0149933 A1* | 7/2005 | Saito et al. .................. 718/100 |
| 2005/0183085 A1* | 8/2005 | Sun ............................. 718/100 |
| 2006/0150185 A1 | 7/2006 | McKenney et al. |
| 2007/0078891 A1* | 4/2007 | Lescouet et al. .......... 707/104.1 |
| 2008/0104602 A1* | 5/2008 | Takeuchi ..................... 718/103 |
| 2008/0155542 A1* | 6/2008 | Maigne et al. ............... 718/100 |
| 2013/0117762 A1* | 5/2013 | Yamashita et al. ........... 719/313 |

OTHER PUBLICATIONS

International Search Report issued Jul. 8, 2011 in counterpart International Application No. PCT/IB/2011/000271.

* cited by examiner

HARDWARE VIRTUALIZATION FOR MEDIA PROCESSING

INCORPORATION BY REFERENCE

This application claims the benefit of U.S. Provisional Application No. 61/294,711 entitled "HARDWARE VIRTUALIZATION FOR VoIP MEDIA PROCESSING" filed on Jan. 13, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computer-based processing systems are now found in practically every piece of modern consumer electronics. For example, residential gateways often include two or three separate processors in addition to a variety of other electronic hardware with each processor performing separate functions. By way of example, a first processor in a telecommunication device such as a gateway can be used solely for processing streaming media, such as voice over IP, television over IP, or video over IP, while a second processor in the telecommunications device may be used to perform a variety of applications, such as servicing the streaming media or even other applications like providing for interactive games and calendars. As used herein, the term "processor" can refer to an individual device as well as one processor of many in a multi-core processor device.

Although processor stability afforded by multiple processors may be desirable, using multiple processors comes at an appreciable costs. Conventional single processor solutions that theoretically are configured support both real-time media processing and a variety of other applications in a software layer are typically avoided because in conventional implementations the real-time media processing cannot be suitably protected should a "glitch" occur in a simultaneously running application program, or should a software update be required.

SUMMARY

Various aspects and embodiments of the invention are described in further detail below.

In an embodiment, a processing apparatus configured to act as a plurality of virtual processors includes a first virtual program space that includes a first program execution memory, the first program execution memory including code to run a non-real-time operating system capable of supporting a one or more non-real-time applications, a second virtual program space that includes a second program execution memory, the second program execution memory including code to run one or more real-time processes, and a central processing unit (CPU) configured to operate in a first operating mode and a second operating mode, the CPU being configured to perform operating system and application activities using the first virtual program space for the first operating mode without using the second virtual program space and without appreciably interfering with the one or more real-time processes that are running in the second operating mode.

In another embodiment, a method for executing a plurality of virtual processors on a single central processing unit (CPU) includes defining a first virtual program space that includes a first program execution memory configured to run a non-real-time operating system capable of supporting a one or more non-real-time applications, defining a second virtual program space that includes a second program execution memory configured to run one or more real-time processes, and switching the CPU so as to alternate between a first operating mode and a second operating mode whereby during the first operating mode the CPU operates from the first virtual program space such that any operating activities that occur during the first operating mode do not appreciably interfere with real-time processes that execute during the second operating mode.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

The following describes a processing system with a single central processing unit (CPU) configured to act as two independent virtual processors: in an embodiment one virtual processor is configured to run general-purpose applications using an operating system; the other virtual processor is configured to perform real-time processing in a reliable manner. One particular advantage of the below-described methods and systems is that, unlike the apparent multiple processing of known operating systems (e.g., different windows in a software layer running different applications), embodiments of the below-described virtual processors are designed to utilize different hardware threads and thereby allow one virtual processor to perform time-critical operations regardless of any possible failures of the other virtual processor. Thus, in an embodiment although a single CPU is used, various real-time critical processing operations are reliably performed by one virtual processor without interruption even if the other virtual processor undergoes a "crash" that might require a reboot to address.

Figure 1:
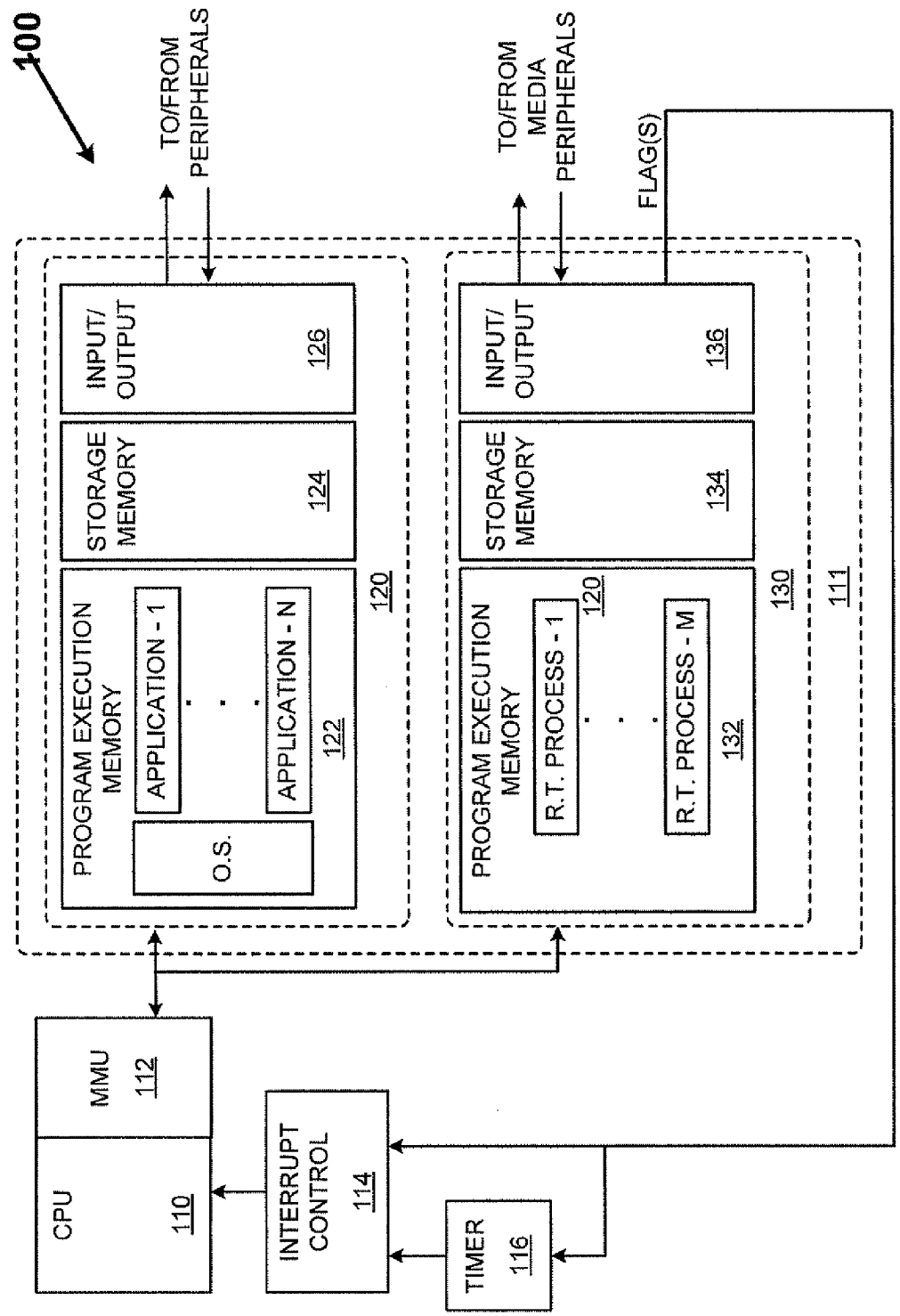
FIG. 1 depicts a processing system capable of functioning as two separate virtual processors.

FIG. 1 depicts a processing apparatus 100 configured to function as two separate virtual processors in accordance with an embodiment. As shown in FIG. 1, processing apparatus 100 includes a CPU 110, a memory management unit (MMU) 112, an interrupt control circuit 114, a timer circuit 116, a first virtual program space 120 and a second virtual program space 130. The first virtual program space 120 and the second virtual program space 130 are separate spaces defined in the total memory space 111 available to the CPU 110.

In an embodiment, the first virtual program space 120 includes a first program execution memory 122, a first storage memory 124 and a set of first input/output circuitry 126 coupled to any number of various peripherals, such as a keypad, a display, a speaker, and so on. The first program execution memory 122 includes code to run a non-real-time operating system (OS) capable of supporting a plurality of applications, such as human-interactive applications (e.g., keypad entry and display) that do not require precision response times. The first storage memory 124 includes any number and type of memory capable of being written to and read from, such as volatile and non-volatile random access memory (RAM), so as to support the OS and applications residing in the first program execution memory 122.

In an embodiment, the second virtual program space 130 includes a second program execution memory 132, a second storage memory 134 and a set of second input/output circuitry 136 coupled to any number of various communications/media peripherals, such as a port transmitting and receiving wireless media-based packets in a Time Division Multiplexed (TDM) fashion, a T1/E1 data interface, an Ethernet interface, and so on.

The second program execution memory 132 includes code written thereon configured to run a number of real-time processes capable of timely processing incoming and outgoing media. For example, in an embodiment, the second program execution memory 132 includes code for Voice over Internet Protocol (VoIP) processing and/or code for any number of voice codecs, DTMF relay support, packet loss concealment, echo cancellation, voice activity detection, comfort noise generation, universal multi-tone generation and/or detection, caller ID generation and/or detection, voice mixing, and facsimile generation and decoding. Similar to the first storage memory 124, the second storage memory 134 includes any number and type of memory capable of being written to and read from so as to support real-time processes.

For the purposes of this disclosure, it is noted that the memories 122, 124, 132 and 134, are depicted as logically different entities, however in an embodiment they are physically combined in a single memory unit. In a particular embodiment, for example, the first storage memory 124 and the second storage memory 134 exist as two separate portions of a single RAM, while the first program execution memory 122 and the second program execution memory 132 exist as separate portions of another single memory device, such as a Read Only Memory (ROM). Alternatively in another embodiment, all four memories 122, 124, 132 and 134 exist as different portions of a single memory device or as different memory segments incorporated into an integrated circuit.

Generally, the overlap of resources between the first operating space 120 and the second operating space 130 is possible as long as the OS and applications of the first operating space cannot "appreciably interfere" with the performance of the real-time processes of the second operating space 130. For example, the first program execution memory 122 and the second program execution memory 132 can share a common code segment, e.g., a Basic Input/Output System (BIOS) embedded in a ROM in order to avoid code duplication as long as such sharing does not lead to appreciable interference with the performance of the real-time processes of the second operating space 130. Still further, certain memory resources, such as cache memories that are transparent to code execution (except for performance enhancement), can be shared between the operating spaces 120 and 130 without being considered to appreciably interfere with the performance of the real-time processes of the second operating space 130 within the context of this disclosure.

In operation, the processing apparatus 100 performs a hardware initialization process, such as a power-up re-boot, such that all devices 110-136 are set to a pre-defined or initial state.

In operation, CPU 110 initializes the interrupt control circuit 114, the timer circuit 116, and the set of second input/output circuitry 136 of the second virtual program space 130. Some parts or all of the interrupt control circuit 114 and timer circuit 116 are considered part of the second virtual program space 130. In various embodiments, the MMU 112, the interrupt control circuit 114, the timer circuit 116 and perhaps some portion of set of second input/output circuitry 136 are "fixed" devices not subject to programming such that the CPU has only very limited or no influence of their behavior. In such embodiments, initialization of the second virtual program space 120 is a very limited task limited to for example zeroing circular buffers or pointers in the second storage memory 134.

The MMU 112 is a hardware component responsible for handling accesses to memory and peripheral devices requested by the CPU 110. Its functions include translation of virtual addresses to physical addresses (i.e., virtual memory management), memory protection, cache control and bus arbitration. The present MMU 112 is configured to generate an interrupt or flag whenever a memory protection violation has occurred.

The interrupt control circuit 114 is a device that is used to combine several sources of interrupt onto one or more CPU-accessible lines while allowing priority levels to be assigned to its interrupt outputs. The present interrupt control circuit 114 has the capacity to present non-maskable, high-priority interrupts to the CPU 110, such as an interrupt indicating a TDM frame boundary, as well as a number of lower-priority interrupts.

The timer circuit 116 is a counter used to periodically generate interrupts, which may be high-priority, non-maskable and/or of a lower priority.

In an embodiment, the CPU 110 further initializes the set of first input/output circuitry 126 of the first virtual program space 120 followed by an initialization of the OS and any specifically identified applications of the first program execution memory, such as applications directed to updating service applications, and so on.

In the embodiment of FIG. 1, the interrupt control circuit 114 includes a "high-priority" interrupt that cannot ordinarily be (directly or indirectly) masked by the CPU 110. Thus, after initialization, the CPU 110 is forced by such a non-maskable, high-priority interrupt to switch from a first (non-real-time) operating mode using the resources of the first virtual program space 120 to a second (real-time) operating mode using the resources of the second virtual program space 130. Switching from the second operating mode back to the first operating mode is accomplished using an appropriate interrupt return command. Thus, two "virtual processors" may be maintained. Examples of non-maskable, high-priority interrupts include the non-maskable interrupt (NMI) line common to Intel 8086-based processors and the fast interrupt (FIQ) line common to ARM processors.

In various embodiments, it is desirable to ensure that any activities, e.g., failures, that occur in one virtual processor do not cause appreciable interference with the other virtual processor. To accomplish this, the MMU 112 is configured to preclude software operating from the first operating space 120 to affect memory and any devices of the second operating space 130 in possibly detrimental ways. For example, using the MMU 112, the CPU 110 is suitably instructed not to access or otherwise alter the second storage memory 134 or the second input/output circuitry 136 when executing code from the OS and/or any application of the first virtual program space 120, i.e., while in the first operating mode. Similarly, in an embodiment it is useful to use the MMU 112 to cause the CPU 110 not to access or otherwise alter the first storage memory 124 or the first input/output circuitry 126 while in the second operating mode. By assuring an exclusivity—or at least a guarantee of non-interference—of resources between the first virtual program space 120 and the second virtual program space 130, activities—and especially failures—that occur in one operating mode which may appreciably affect the other operating mode are effectively prevented.

To further ensure that one virtual processor does not appreciably interfere with operation of another virtual processor, in an embodiment operating states of the CPU 110 are stored upon activation of a high-priority interrupt such that the CPU operating states of the first operating mode are preserved while the CPU is operating in the second operating mode. Such operating states are preserved by "pushing" the operating states onto a software stack located in the second storage memory, and re-established by "pulling" the stored data from the software stack back into the appropriate CPU register. Such states are alternatively stored into special storage memories built within the CPU 110.

Figure 2:
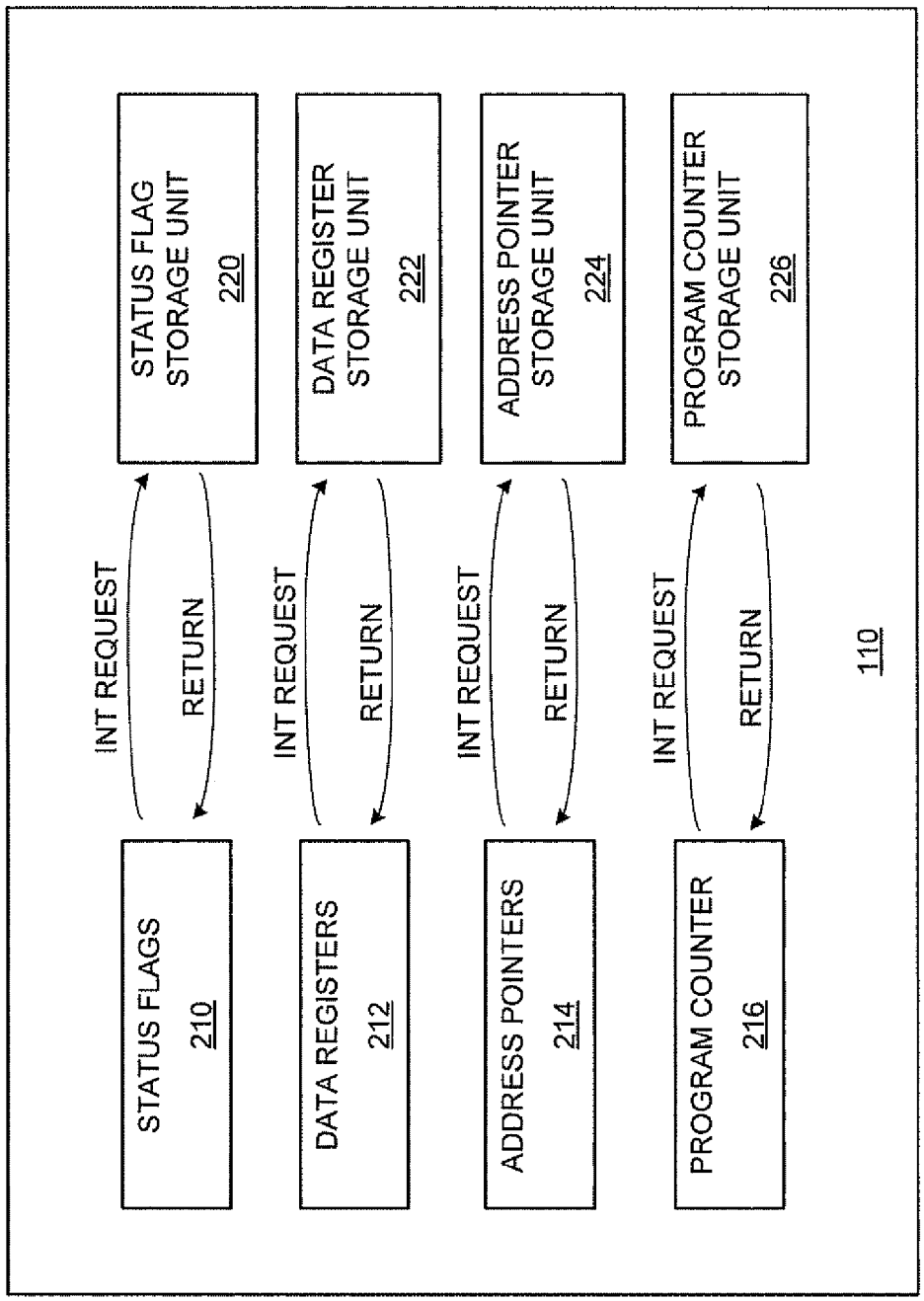
FIG. 2 depicts details of the CPU of FIG. 1.

FIG. 2 shows a portion of the CPU 110 of FIG. 1 including a status flag register 210, a set of data registers 212, a set of address pointers 214 and a program counter 216, in accordance with an embodiment of the disclosure. While the depicted registers 210-216 are typically present in the majority of CPU types, including the ARM line of processors, it is noted that the depicted registers/operating states 210-216 of FIG. 2 are not exhaustive of the type and number of operating states that are useful to store and retrieve in an interrupt setting. As is suggested by FIG. 2, the values of the various registers 210-216 are stored in dedicated storage units 220-226 upon the CPU 110 receiving some signal triggering a high-level interrupt. As is also suggested by FIG. 2, the values of the various registers 210-216 can be re-stored by virtue of their respective dedicated storage units 220-226 upon return from the high-level interrupt. Accordingly, critical operating states are preserved as the CPU services the high-priority interrupts and returns from the high-priority interrupts.

As with preserving operating states of the first operating mode, in an embodiment the CPU is configured to store various operating states of the second operating mode when transitioning to the first operating mode such that such operating states are quickly re-established upon receipt at the CPU of the next high-level interrupt.

For interrupt-driven systems, there are a number of useful schemes to trigger an interrupt or stream of interrupts. For example, in one embodiment where streams of media packets are received at regular or irregular intervals, some form of semaphore, such as the FLAG signal leaving the set of second input/output circuitry 136, is used to trigger high-priority interrupts at the interrupt control circuit 114. Such an interrupt scheme allows for the appropriate real-time processing of media packets on an "as needed" basis.

In another embodiment timing circuitry, such as the timer circuit 116 of FIG. 1, is used to periodically trigger high-priority interrupts. Assuming that the periodicity of the timer circuit 116 is sufficient, media packets are appropriately processed without failure during those periods when the high-priority interrupts are being serviced.

In an embodiment, the timer circuit 116 is configured to periodically trigger the high-priority interrupts at intervals which less than intervals of media packets transmitted to, or received by, the processing apparatus 100. In an embodiment, when real-time processes of the second virtual program space 130 are appropriately configured to process media packets over multiple time slots, applications executing in the first virtual program space 120 are performed with appreciable reduced latency.

Figure 3:
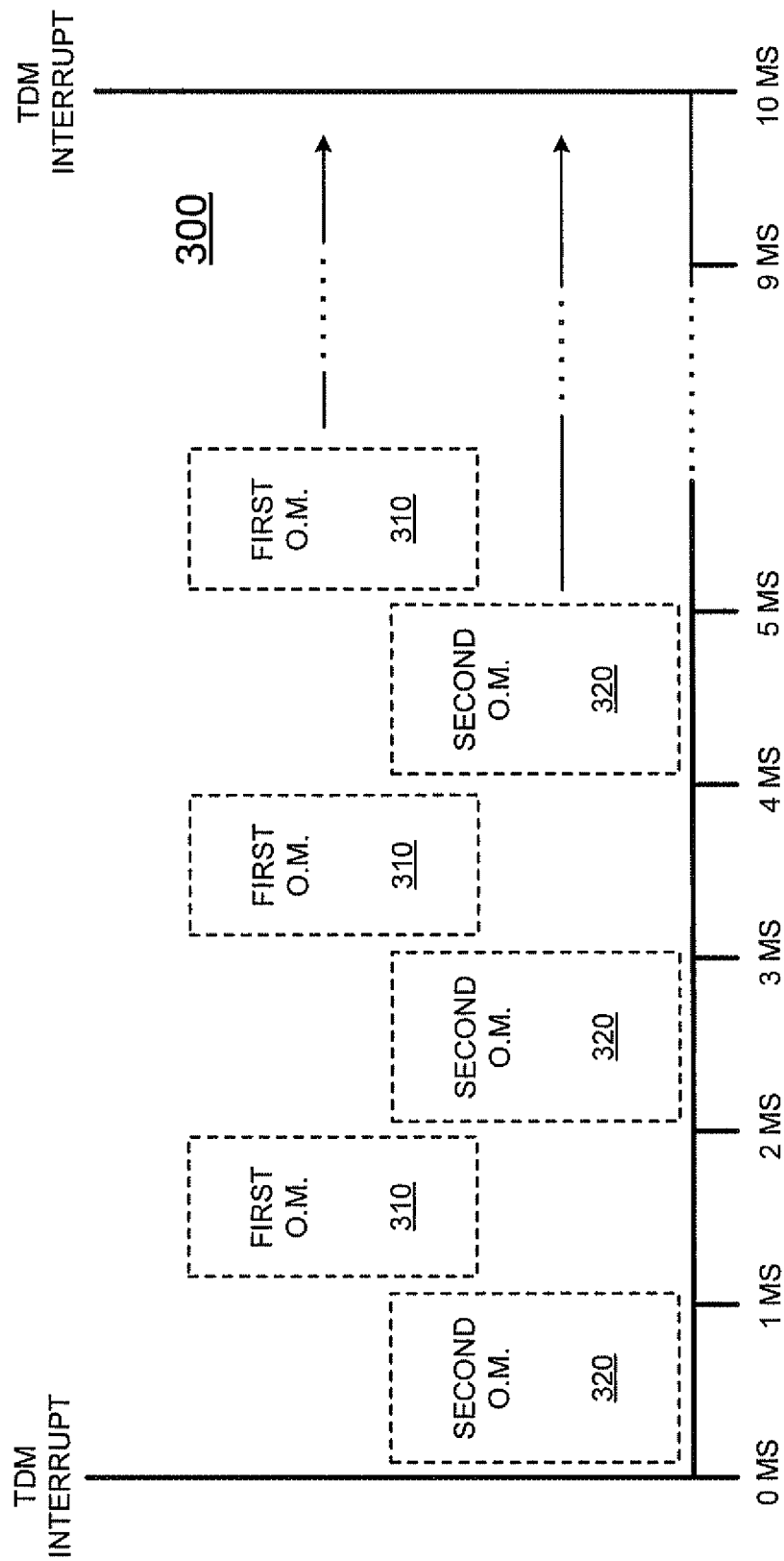
FIG. 3 depicts a timing diagram for implementing the two virtual processors of FIG. 1.

Reference is made to FIG. 3, which is a timing diagram 300 of a suitable interrupt scheme in which the processing apparatus 100 of FIG. 1 switches between its first operating mode and its second operating mode. In the example of FIG. 3, media packets (not shown) are transmitted and received in a time division multiplexed (TDM) scheme at a rate of ten milliseconds per packet. Interrupts, however, are set to occur every two milliseconds noting that the exact duration and frequency of the second operating mode time slots is dynamically adjustable to account for quality of service (QoS) requirements of the media packets. Thus, the processing bandwidth of a CPU, such as the CPU 110 of FIG. 1, is divided into a set of first frames/time slots 310 of a first (non-real-time) operating mode (O.M.) and a set of second frames/time slots 320 of a second (real-time) O.M. By using such an arrangement of processing bandwidth, not only are first and second virtual processors established, but latency of applications running during the first operating mode is reduced. For example, a home gateway application supporting online gaming running during the first operating mode might show substantial subjective performance improvement if timing resolution is increased from eight milliseconds to two milliseconds.

Figure 4:
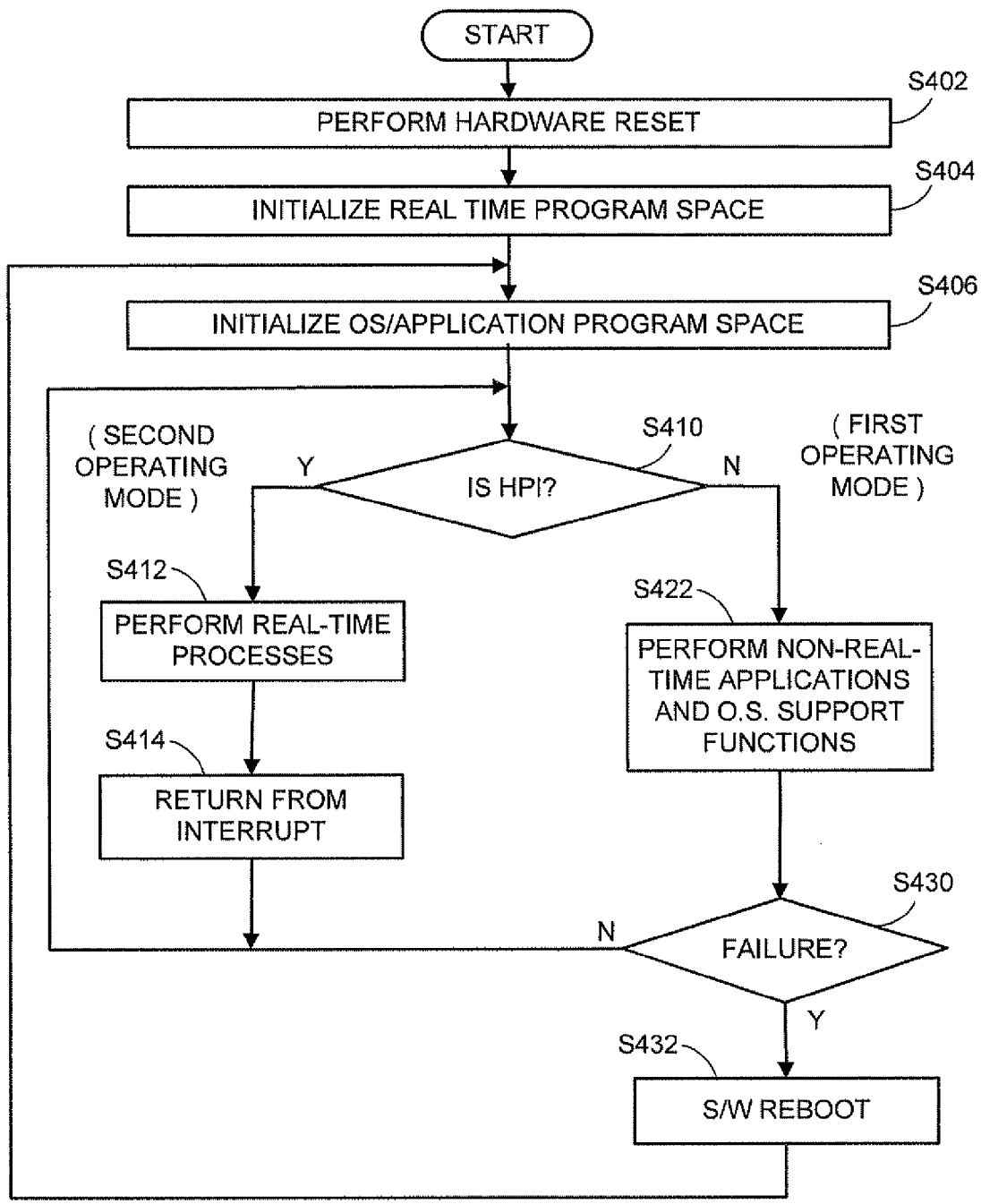
FIG. 4 is a flowchart outlining an operation of the disclosed methods and systems for executing a plurality of virtual processors using a single processor.

FIG. 4 is a flowchart showing the operation of a plurality of virtual processors using a single CPU, in accordance with an embodiment of the disclosure. That is, the flowchart of FIG. 4 shows a method for hardware virtualization of multi-treading on a single processor, as compared to multi-threading using multiple processors, or software multi-tasking on a single processor. While the below-described steps are described as occurring in a particular sequence for convenience, it is noted that the order of various operations may be changed from embodiment to embodiment. It is further noted that various operations may occur simultaneously or may be made to occur in an overlapping fashion.

The process starts at S402 where a hardware reset of a processing apparatus having a single CPU and two separate operating spaces—a first (real-time) operating space and a second (non-real-time) operating space—is performed. Next, in step S404 the second operating space used for real-time processing is initialized. As discussed above, initialization can involve initialization of storage memories, input/output circuitry, timing circuitry and interrupt control circuitry. When input/output circuitry, timing circuitry and interrupt control circuitry are programmable by the CPU, the timing and/or interrupt circuitry is configured so as to generate non-maskable, high-priority interrupts in response to the reception of media packets, or according to some periodicity, so as generate interrupts at intervals (optionally) less than intervals of received media packets. However, as the input/output circuitry, the timing circuitry and the interrupt control circuitry are unalterable in certain other embodiments, initialization of such devices is not possible by the CPU and the generation of high-priority interrupts remains a function of hardware architecture. Control continues to step S406.

In step S406 the operating space for the non-real-time program space is initialized. As discussed above, in an embodiment, such an initialization includes the initialization of hardware, such as memory and input/output circuitry, as well as the initialization of an operating system and various applications to run on the operating system. Control continues to step S410.

In step S410 a determination is made as to whether a high-priority interrupt has been generated. As discussed above, such high-priority interrupts are used to enable the CPU to switch between a first operating mode in which the operating system and respective applications of step S406 are run, and a second operating mode in which the real-time processes of step S404 is run. When a high-priority interrupt has been generated, control jumps to step S412; otherwise, control jumps to step S422.

In step S412, in response to a high-priority interrupt, the real-time processe(s) of step S404 are executed while being protected against influence by an operating system or any non-real-time application being executed in other steps. As discussed above, in various embodiments such real-time processes are also configured to process streaming media packets over multiple time slots in a way that reduces latency of at least one application initialized in step S406. Next, in step S414 a return from the second operating mode to the first operating mode is performed. Control then returns to step S410 where further interrupts are received and a determination is made for each interrupt whether the received interrupt is a high-priority interrupt.

In step S422, when a received interrupt is determined to be not a high priority interrupt, the non-real-time applications initialized in step S406, along with supporting OS functions, are performed. Again as discussed above, it is useful to incorporate some form of hardware protection, such as the MMU 112 of FIG. 1, to prevent an OS and/or non-real-time application from interfering with the real-time processes of step S412 by, for example, by inadvertently altering memory or input/output circuitry used by the real-time processes. Next, in step S430, a determination is made as to whether a failure has occurred in either the operating system or one of the applications. Some examples of failures include for example, an indication from an MMU that an attempt to access invalid memory locations or resources have been made, or that an infinite software loop has been engaged and subsequently identified by use of a watchdog timer. If a failure has occurred, control continues to step S432; otherwise, control jumps back to step S410.

In step S432, a software reboot operation is performed on hardware associated with step S406, and control jumps back to step S406 where the operating system and respective applications is re-initialized. As a software reboot operation does not require use of a high-priority interrupt, it is to be appreciated that software boot operations will affect only those devices and memory spaces normally accessible by a CPU during the first operating mode, and thus real-time processes of the second operating mode will remain unaffected.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A processing apparatus configured to act as a plurality of virtual processors, comprising:
    a first virtual program space that includes a first program execution memory, the first program execution memory including code to run a non-real-time operating system capable of supporting a one or more non-real-time applications;
    a second virtual program space that includes a second program execution memory, the second program execution memory including code to run one or more real-time processes, wherein the second virtual program space further includes a set of second input/output circuitry configured to trigger the high-priority interrupts upon reception of a media packet: and
    a central processing unit (CPU) configured to operate in a first operating mode and a second operating mode, the CPU being configured to perform operating system and application activities using the first virtual program space for the first operating mode without using the second virtual program space and without interfering with the one or more real-time processes that are running in the second operating mode.

2. The processing apparatus of claim 1, wherein the second virtual program space further includes a second storage memory.

3. The processing apparatus of claim 2, further comprising a memory management unit configured to prevent at least one of the operating system and any application of the first operating mode from modifying the second storage memory.

4. The processing apparatus of claim 1, further comprising a memory management unit configured to prevent at least one of the operating system and any application of the first operating mode from modifying the set of second input/output circuitry.

5. The processing apparatus of claim 1, further comprising interrupt control circuitry configured to generate non-maskable, high-priority interrupts that cause the CPU to switch from the first operating mode to the second operating mode.

6. The processing apparatus of claim 5, further comprising a first state storage memory that stores operating states of the CPU upon activation of a high-priority interrupt such that CPU operating states of the first operating mode are preserved while the CPU is operating in the second operating mode.

7. The processing apparatus of claim 5, further comprising a second state storage memory that stores CPU operating states of the second operating mode while the CPU is operating in the first operating mode.

8. The processing apparatus of claim 5, wherein during the second operating mode the CPU is programmed to support voice over internet protocol (VoIP) media processing.

9. The processing apparatus of claim 1, further comprising a timer circuit configured to periodically trigger the high-priority interrupts, wherein the timer circuit is configured to periodically trigger the high-priority interrupts at intervals less than intervals of media packets received by the processing apparatus, and the one or more real-time processes are configured to process media packets over multiple time slots in a way that reduces latency of at least one application executing in the first virtual program space.

10. The processing apparatus of claim 9, wherein at least one of the duration and frequency of the multiple time slots is dynamically adjustable to account for quality of service (QoS) requirements of the media packets.

11. A method for executing a plurality of virtual processors on a single central processing unit (CPU), comprising:
    defining a first virtual program space that includes a first program execution memory configured to run a non-real-time operating system capable of supporting a one or more non-real-time applications;

defining a second virtual program space that includes a second program execution memory configured to run one or more real-time processes, a second storage memory as part of the second virtual program space, and wherein the operating system and all applications of the first operating mode are precluded from modifying the second storage memory, and a set of second input/output circuitry as part of the second virtual program space, and wherein the operating system and all applications of the first operating mode are precluded from modifying the set of second input/output circuitry;

generating a stream of non-maskable, high-priority interrupts in response to a reception of a stream of respective media packets; and switching the CPU so as to alternate between a first operating mode and a second operating mode whereby during the first operating mode the CPU operates from the first virtual program space such that any operating activities that occur during the first operating mode do not interfere with real-time processes that execute during the second operating mode.

12. The method of claim 11, further comprising generating the stream of non-maskable, high-priority interrupts while in the first operating mode in order to cause the CPU to switch to the second operating mode.

13. The method of claim 12, wherein generating each high-priority interrupt includes storing operating states of the CPU such that CPU operating states of the first operating mode are preserved while the CPU is operating in the second operating mode.

14. The method of claim 12, further comprising operating the CPU so as to process voice over internet protocol (VoIP) media during the second operating mode.

15. The method of claim 11, wherein the step of generating the stream of non-maskable, high-priority interrupts includes generating interrupts at intervals less than intervals of received media packets such that the one or more real-time processes of the second virtual program space process media packets over multiple time slots in a way that reduces latency of at least one application executing in the first virtual program space.

* * * * *